(12) United States Patent
Aytur et al.

(10) Patent No.: US 7,937,514 B2
(45) Date of Patent: May 3, 2011

(54) CWUSB HOST MANAGEMENT SYSTEM

(75) Inventors: Turgut Aytur, Irvine, CA (US);
Frederic Battaglia, Irvine, CA (US);
Saurabh Garg, Irvine, CA (US);
Batuhan Okur, Irvine, CA (US);
Ping-Wen Ong, Irvine, CA (US);
Venkatesh Rajendran, Irvine, CA (US)

(73) Assignee: Realtek Semiconductor Corp., Hsinchu (TW)

( * ) Notice: Subject to any disclaimer, the term of this patent is extended or adjusted under 35 U.S.C. 154(b) by 55 days.

(21) Appl. No.: 12/269,594

(22) Filed: Nov. 12, 2008

(65) Prior Publication Data
US 2009/0125658 A1    May 14, 2009

Related U.S. Application Data

(60) Provisional application No. 60/987,394, filed on Nov. 12, 2007.

(51) Int. Cl.
*G06F 15/16* (2006.01)
(52) U.S. Cl. ....................................... 710/110; 709/227
(58) Field of Classification Search .................. 710/110; 709/209, 227
See application file for complete search history.

(56) References Cited

U.S. PATENT DOCUMENTS

| | | | | |
|---|---|---|---|---|
| 5,765,200 A * | 6/1998 | McIlvain et al. | ............... | 711/170 |
| 5,961,624 A * | 10/1999 | Takayama | ..................... | 710/314 |
| 6,308,239 B1 * | 10/2001 | Osakada et al. | ............... | 710/316 |
| 6,725,302 B1 * | 4/2004 | Benayoun et al. | ............... | 710/62 |
| 6,732,218 B2 * | 5/2004 | Overtoom et al. | ............ | 710/313 |
| 6,950,859 B1 * | 9/2005 | Bartek et al. | ................... | 709/217 |
| 7,093,057 B2 * | 8/2006 | Choi | ............................. | 710/313 |
| 7,305,511 B2 * | 12/2007 | Barrett et al. | .................. | 710/316 |

(Continued)

FOREIGN PATENT DOCUMENTS

JP     2005267550 A  *  9/2005

OTHER PUBLICATIONS

Wireless Universal Serial Bus Specifications, Agere, HP, Intel, Microsoft. NEC, Phillips, Samsung, May 12, 2005, Revision 1.0.

*Primary Examiner* — Paul R Myers
(74) *Attorney, Agent, or Firm* — Thomas, Kayden, Horstemeyer & Risley, LLP

(57) ABSTRACT

Universal Serial Bus (USB) is a Master/Salve or Host/Device system in which there is only one host and one or more devices connected by cables to the host. To connect a USB device to a different host controller (say another PC), the user unplugs the USB cable and establishes the connection physically by plugging the cable into the new host controller interface. Certified Wireless USB (CWUSB), a logical extension to the USB, preserves the USB connection model, except that the link between the host and the device is now using a wireless technology. A wireless device is usually connected to only one wireless host at a given point of time, even though several wireless hosts may be co-located in the same physical neighborhood. The connection between the wireless host and device is initiated by the device. A device usually selects a wireless host from a stored set of known hosts that have established a trusted relationship with the device. If more than one wireless host is operating in the same neighborhood, there is no well known established procedure for the device to select a particular wireless host to establish a connection.

32 Claims, 18 Drawing Sheets

U.S. PATENT DOCUMENTS

| | | | |
|---|---|---|---|
| 7,478,188 B2 * | 1/2009 | Patton | 710/300 |
| 7,523,243 B2 * | 4/2009 | Bohm et al. | 710/305 |
| 2006/0092899 A1 * | 5/2006 | Hong et al. | 370/338 |
| 2006/0123166 A1 * | 6/2006 | Toebes et al. | 710/106 |
| 2006/0142030 A1 * | 6/2006 | Coskun et al. | 455/466 |
| 2006/0246840 A1 * | 11/2006 | Borowski et al. | 455/41.2 |
| 2007/0067628 A1 * | 3/2007 | Kim et al. | 713/168 |
| 2007/0073842 A1 * | 3/2007 | Uehara | 709/218 |
| 2007/0076875 A1 * | 4/2007 | Kaechi | 380/247 |
| 2007/0086425 A1 * | 4/2007 | Leow et al. | 370/350 |
| 2007/0283018 A1 * | 12/2007 | Yun | 709/226 |
| 2007/0291946 A1 * | 12/2007 | Ohtsu et al. | 380/270 |
| 2007/0294456 A1 * | 12/2007 | Chan et al. | 710/313 |
| 2008/0005262 A1 * | 1/2008 | Wurzburg et al. | 709/217 |
| 2008/0024815 A1 * | 1/2008 | Oak | 358/1.15 |
| 2008/0222315 A1 * | 9/2008 | Maszak et al. | 710/14 |

* cited by examiner

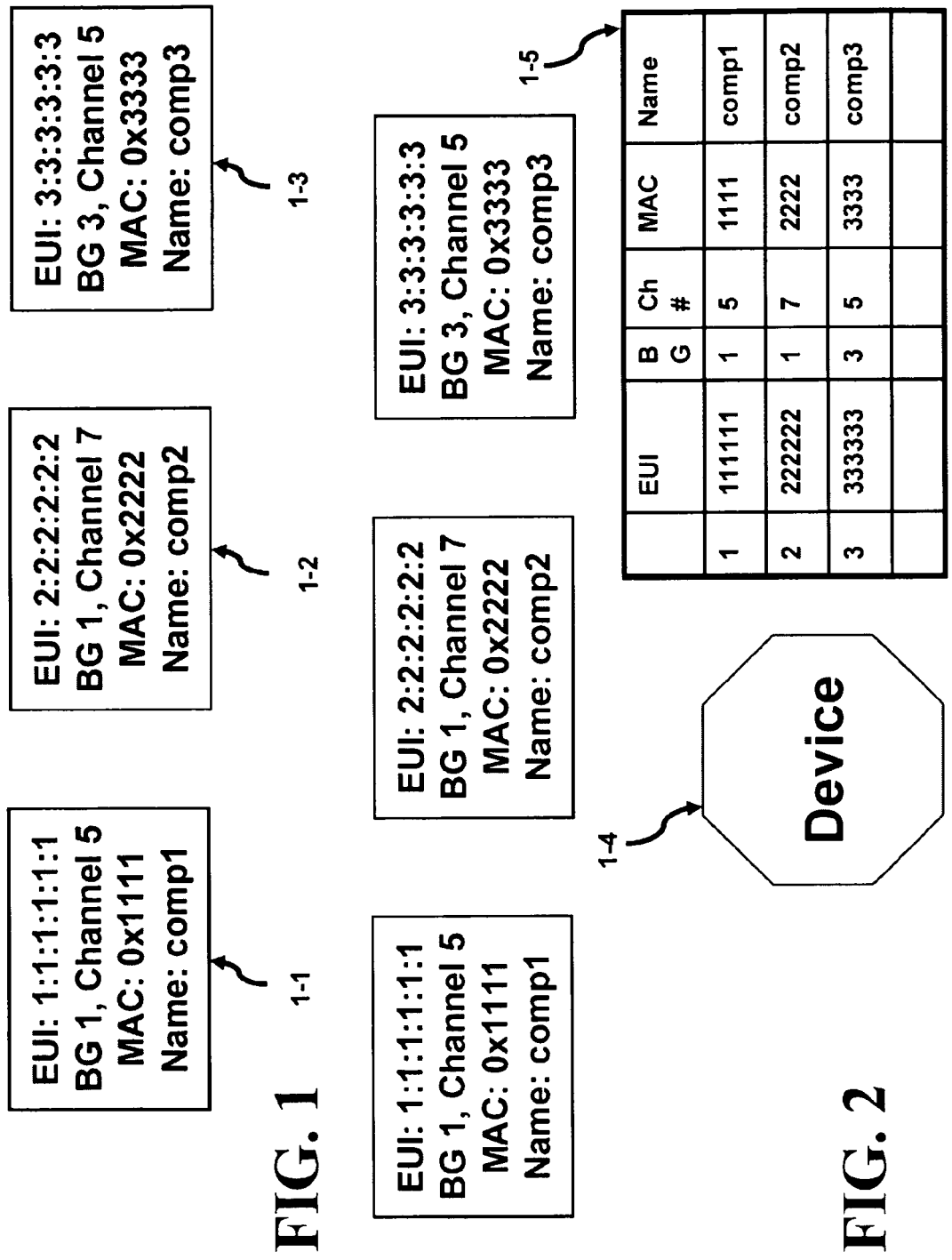

CWUSB HOST MANAGEMENT SYSTEM

CROSS-REFERENCE TO RELATED APPLICATION(S)

This application claims the benefit of the filing date of U.S. Provisional Patent Application No. 60/987,394, filed Nov. 12, 2007, the disclosure of which is incorporated by reference within.

BACKGROUND OF THE INVENTION

Universal Serial Bus (USB) is a Master/Slave or Host/Device system in which there is only one host and one or more devices connected by cables to the host. A personal computer (PC) can have several USB ports and corresponding wires to connect the PC to its peripherals. Many different USB peripherals like mouse, keyboard, printer, scanner, hard disk, etc. can be connected to a single USB host controller residing on the personal computer. To connect a USB device to a different host controller (say another PC), the user unplugs the USB cable and establishes the connection physically by plugging the cable into the new host controller interface.

BRIEF SUMMARY OF THE INVENTION

Certified Wireless USB (CWUSB), a logical extension to the USB, preserves the USB connection model, except that the link between the host and the device is now using a wireless technology. A wireless device is usually connected to only one wireless host at a given point of time, even though several wireless hosts may be co-located in the same physical neighborhood. The connection between the wireless host and device is initiated by the device. A device usually selects a wireless host from a stored set of known hosts that have established a trusted relationship with the device. If more than one wireless host is operating in the same neighborhood, there is no well known established procedure for the device to select a particular wireless host to establish a connection. This invention provides a procedure to overcome this difficulty.

The host can also be called a master; while the device can be called a slave. The master or host can be a personal computer, PDA, cell phone, or intelligent TV. The slave or device can be a projector, printer, flat screen, hard disc or speaker system, etc. In addition, the host table can be called a master table. The master/slave nomenclature helps project the slave or device being submissive to the master or host.

Consider a home usage scenario for a wireless USB hard drive which is shared between a desktop and a laptop computer. In this case, the user should have a mechanism to select the host to which the connection should be established and the process is user-driven. Some scenarios also require a more ad hoc interconnect establishment. For example, in a meeting room scenario with a wireless USB projector shared between many wireless hosts, the connection is constantly switched across the hosts depending on the speaker. In this case any person in the meeting room can hold the connection to the projector until his/her presentation is finished. Hence, the wireless projector should constantly switch the connection and search for wireless hosts that would like to retain the connections. Thus, we need to provide an efficient mechanism to maintain wireless connections that can support wide-variety of usage scenarios for CWUSB.

A data link allows data to be transferred between the host and device. The CWUSB protocol allows this data flow or link to occur as a packet based connection. In addition, the wireless connection uses the WiMedia protocol to carry the modulated signal.

The most common solution employed for host selection in CWUSB is using a physical switch on the device to select/cycle through the list of known hosts. However, this does not account for the complex connection scenarios and also does not provide a good user experience in the host selection. In this proposal, we have invented a host-neutral solution to provide an easy interface for host selection and connection management in CWUSB.

BRIEF DESCRIPTION OF THE DRAWINGS

Please note that the drawings shown in this specification may not be drawn to scale and the relative dimensions of various elements in the diagrams are depicted schematically and not to scale.

FIG. 1 depicts three hosts where each host has an identifier.

FIG. 2 depicts the three hosts and a device. The table holds the identifiers of the hosts in accordance with the present invention.

DETAILED DESCRIPTION OF THE INVENTION

Figure 3:
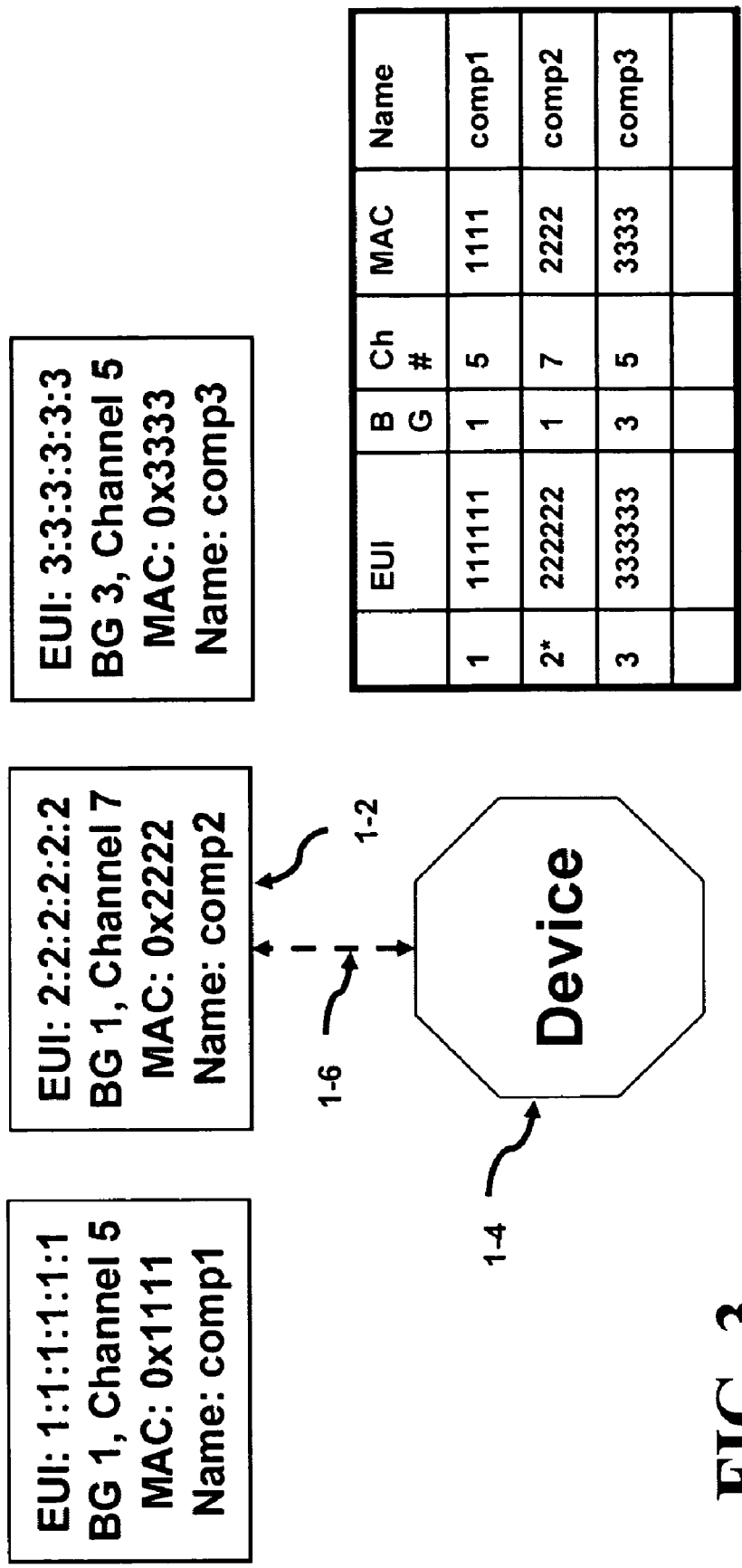
FIG. 3 shows the connection formed between a device and one of the hosts in greater detail in accordance with the present invention.

In our proposed approach, we define a new device class interface to any existing CWUSB device. The new device class interface provides a control channel to the device (while connected to the host either in wired or wireless mode) for performing host selection and connection management. We define a set of control commands that simplifies the host selection and provide a user-friendly graphical user interface (GUI) for interacting with the end-user/owner of the device.

In a wireless environment, a CWUSB device can learn a lot about the CWUSB hosts around it simply by scanning the channels and listening to the traffic. From the beacon packet, one can learn the sender's: EUI-48 from the device identifier of the Beacon Parameters; Vender ID, Vendor type and product name string from the Identification IE in the beacon; PRY capability (Band group, Rate) from PHY Capabilities IE; MAC address from the MAC header of the packet; CHID from the Host-Info IE in the MMC packet; and Channel and Band group. Please note that the beacon can be communicated as a wireless packet based interface.

If the CWUSB device has done association with any of the hosts, it might have the previous connection context and host friendly name (cable association).

Collection of all this information enables the CWUSB device to have enough host information to do some management work. The informational content is formed from the collection of all this information.

To facilitate the management control flow, we need to add one more management interface. This interface will need a special driver installed on the host computer so that the user can interact with the shared device with defined protocol. Since the device will have this extra interface plus the original interface, it will become a CWUSB composite device. This interface will have special class/vendor request to scan the hosts, report the hosts, handoff control to other hosts and display information if it is capable of doing it.

In addition to the new class, we also need to define a separate communication channel in addition to the usual CWUSB connection. The reason that we need another channel is due to the way CWUSB works: one CWUSB device can only connect to one CWUSB host using CWUSB protocol. Thus, the CWUSB protocol will not allow a second host to communicate with the device. Instead, the second channel is used when a second host wants to ask the device to connect to it instead of the connection formed between the previous host and this device.

Implementation:

The new device interface class is defined to do the host management on the device. Let's call it Host Management Class (HMC). HMC has following class requests: Init; Scan; Report; Handoff; Display; Add; Delete; Poll; Customized request; and Security.

Init: Initialize the host database on the device. Remove any existing host information including or excluding the host currently connected to the device.

Scan: This request asks the device to stall scan for the hosts. It has following options: Channel; Band Group; Timeout; and Maximum number of hosts Report: This request asks the device to return information regarding the host information it already has, the capability of the device, etc. It has following options: Capability—Device's capability in handling host information like maximum number of host entries, scan limitation, display capability, etc.; Host count—Return the number of host entries in the database; and Host list—Return all the host information in the database.

Handoff: This request asks the device to halt the connection with the current connected host and try to connect to another host. It has following options; Host index—A selected host from the host database; Qualified host—A random host from a list of qualified hosts from the host database. For example, hosts in BG 1, hosts on channel 7, hosts from a particular vendor, etc.; and Any host—A random host from the host database.

When device tries to connect to the new host, it might encounter two conditions: 1) it had associated with the host in the past. It only needs to initiate the normal CWUSB connection procedure, and 2) it did not associate with the host in the past. In this case, it needs to proceed to use any of the association methods known to it, e.g. numeric association, manual association, etc.

Display: This request asks the device that has display capability to show certain information. It has following options: Host list—Display host information in the database and String—Display a given text information.

Add: This request asks the device to add an entry into the host database;

Delete: This request asks the device to delete certain entries from the host database; and Poll: This request asks the device to enter the polling mode. Polling mode is a special operating mode of the device. When a CWUSB device has an HMC interface, it normally exposes the HMC and other functional interfaces. But in polling mode, it only exposes the HMC interface and tries to poll all the reachable hosts one by one for further information. The HMC driver on the host will work with the special GUI to enable all the special functions in the polling mode. For example, in the meeting room environment, the current presenter could set the CWUSB projector into polling mode after he finishes his presentation. The projector will start the polling mode and polling the adjacent hosts in turn asking who like to take control of the projector. After one user requests to connect to the projector through the HMC GUI, the projector will eventually receive the request by polling this host. It then disconnects and reconnects back to the currently connected host using a normal mode that has regular projector function and HMC function.

There are many possible data that can be exchanged in the polling mode. Following is a list of some example: Request for connection—This request ask the device to connect back in normal mode; Request for removal—This request asks the device not to poll the current host with optional parameters like time out, etc.; Request for shared host information—This request asks the device to send shared information from all the hosts to the current host; Request for connection history—This request asks the device to send the connection history to the current host; and Register host Information—This request sends some public sharable information regarding the current host to the device so that the information could be distributed to other polled host.

Customized Request: This request can be used to send any customized request. For example, we can send a special request to ask the device to switch function.

Security: This request can be used to establish security-related information. For example, we can use this command to set a password that can be used in OHRP.

In the device descriptor of this CWUSB device, the class, subclass and protocol code should be all zeros to indicate this is a composite device. We need to have one interface that is HMC and other interface(s) for the main function of the device.

Since USB and CWUSB protocols are based on Master-slave (or Host-device), a device can only be connected to one host at any given time. In a sharing environment where HMC is used, this limitation cripples the usefulness of HMC since the device could not be shared anymore once it is connected to one host. If a second host wants to use this device, it can only wait until the previous connected host releases this device for new connection. To enable the possibility for the second host to connect to this device, a new secondary communication channel (besides the CWUSB) is required. This protocol is called the Out-of-band Host Request Protocol (OHRP) and can easily be designed to co-work with the original CWUSB protocol. Any out-of-band protocol with respect to the CWUSB can be used for this purpose. One possible method is based on the WiMedia beaconing mechanism, which is independent of CWUSB protocol. Since all standard WiMedia devices (CWUSB devices are WiMedia devices) need to handle beaconing, it is the easiest way to carry out this task.

In WiMedia specification, every device needs to send out a beacon and be able to process beacons sent by other WiMedia devices in order to: a) synchronize with other devices, and; b) process the interaction requirements that are sent through the beacons. Every beacon can have many different kinds of Information Elements (IE) as defined in the WiMedia spec. One of the IE called Application-Specific Information Element (ASIE) can be used to do any application specific task. We could use ASIE to facilitate part of HMC functionality. The data portion of this ASIE contains following fields:

Request type: Request type defines the request the second host wants to send to the device.

The typical requests include: Halt; Rescan; Reset; Random handoff; Handoff to me; and Set password.

Target device address: This is the address of the recipient device of this ASIE. EUI-48 could be a feasible candidate.

Optional parameters: There might be some extra parameters that are required for different type of requests.

Optional security information: In order to prevent any unauthorized host from being issued a request without permission, we could add this optional security information to authenticate the request. This information contains the previously established password in encrypted format using any suitable encryption algorithm.

Examples are provided below to illustrate how HMC can be used in several applications.

Assume there are three hosts with following details as illustrated in FIG. 1. The host 1-1 (on the left) contains information such as: BG1, Channel 5, MAC address=0x111, name=comp1 and EUI=1:1:1:1:1:1. The information for hosts 1-2 and 1-3 are given within their corresponding rectangles.

When there is a device (1-4) with HMC interface turn on, it will scan the hosts and have following host table 1-5 that can be stored in memory as illustrated in FIG. 2. Note that the information for all three hosts, 1-1 through 1-3, are stored in table 1-5.

This device will choose to connect 1-6 to a host, assume that the host 1-2 as depicted in FIG. 3. Note the asterisk in the first column on 2.

Figure 4:
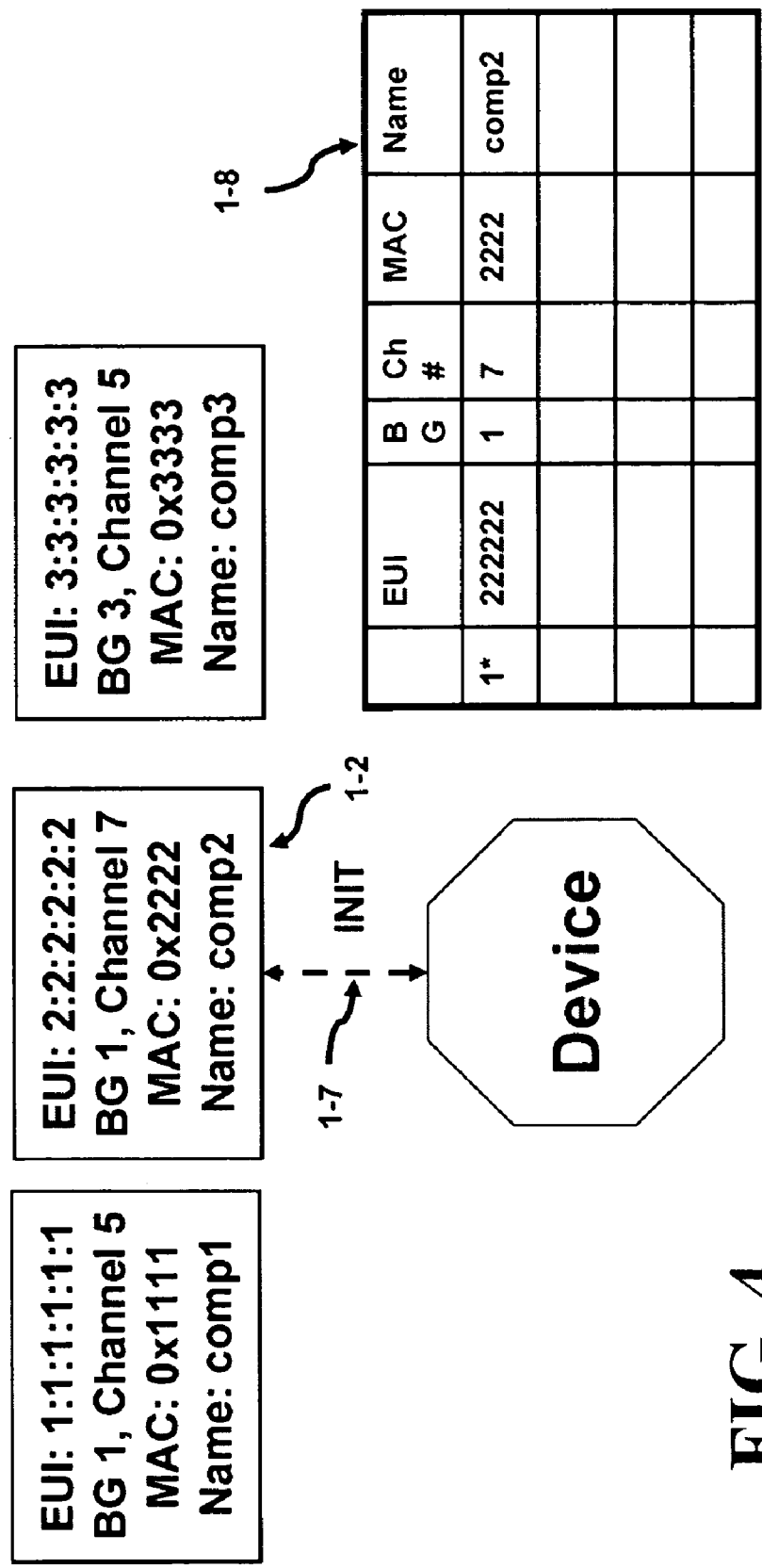
FIG. 4 illustrates the initialization step between a device and one of the hosts in accordance with the present invention.

The host sends an 'init' request 1-7 to clean up the table (excluding itself). The current host information is the only entry remaining in the host 1-2. The table 1-8 will now have only one entry as illustrated in FIG. 4. Now the asterisk in the first column on 1 since that is the last remaining row.

Figure 5:
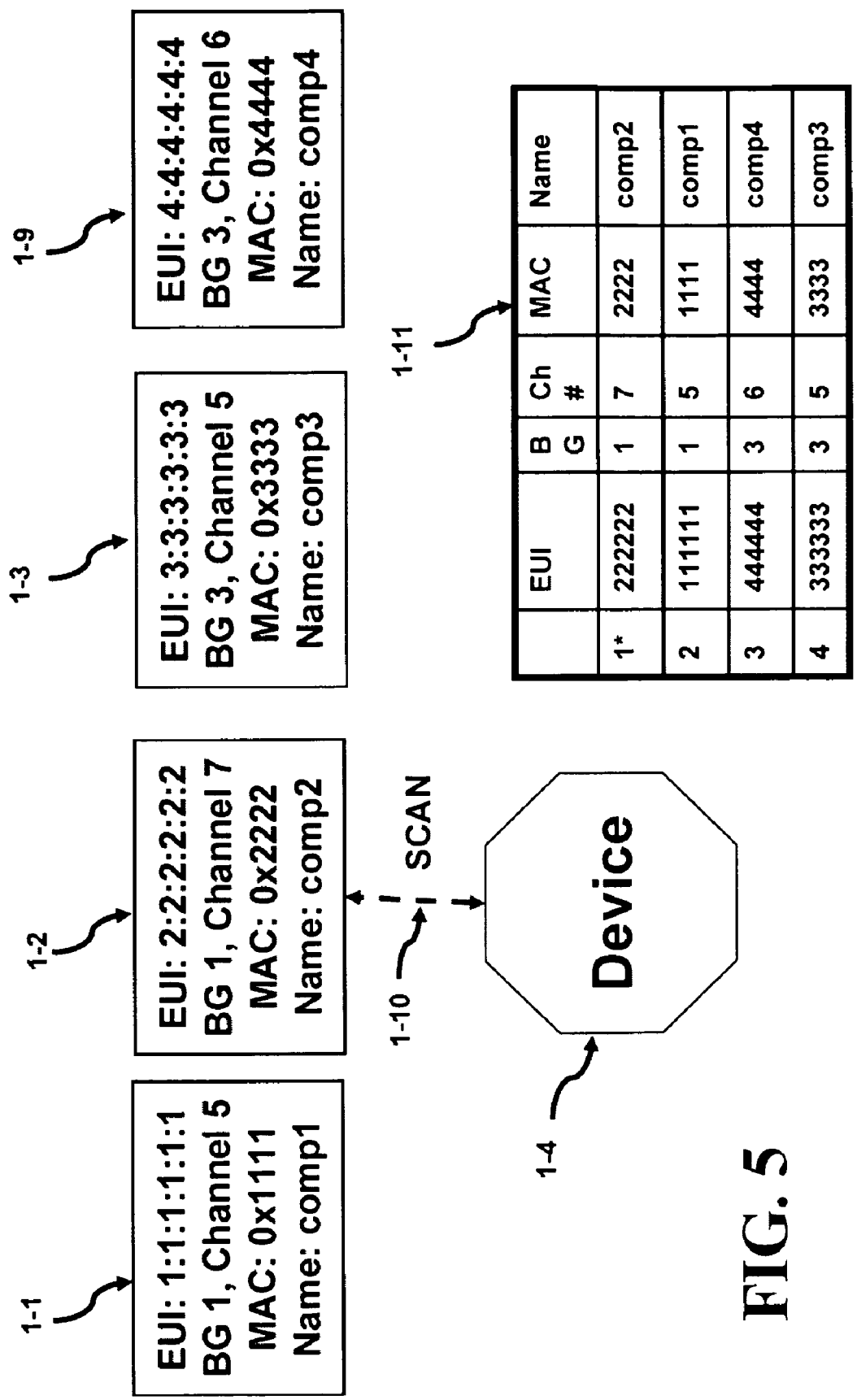
FIG. 5 illustrates the scan step between a device and one of the hosts in accordance with the present invention.

The host 1-2 now sends a request to the device 1-4 to do a new scan 1-10. Before the device does the scan, a fourth host 1-9 appears as shown in FIG. 5. Note that all four of the hosts scanned by the device 1-4 are placed in the table 1-11.

Figure 6:
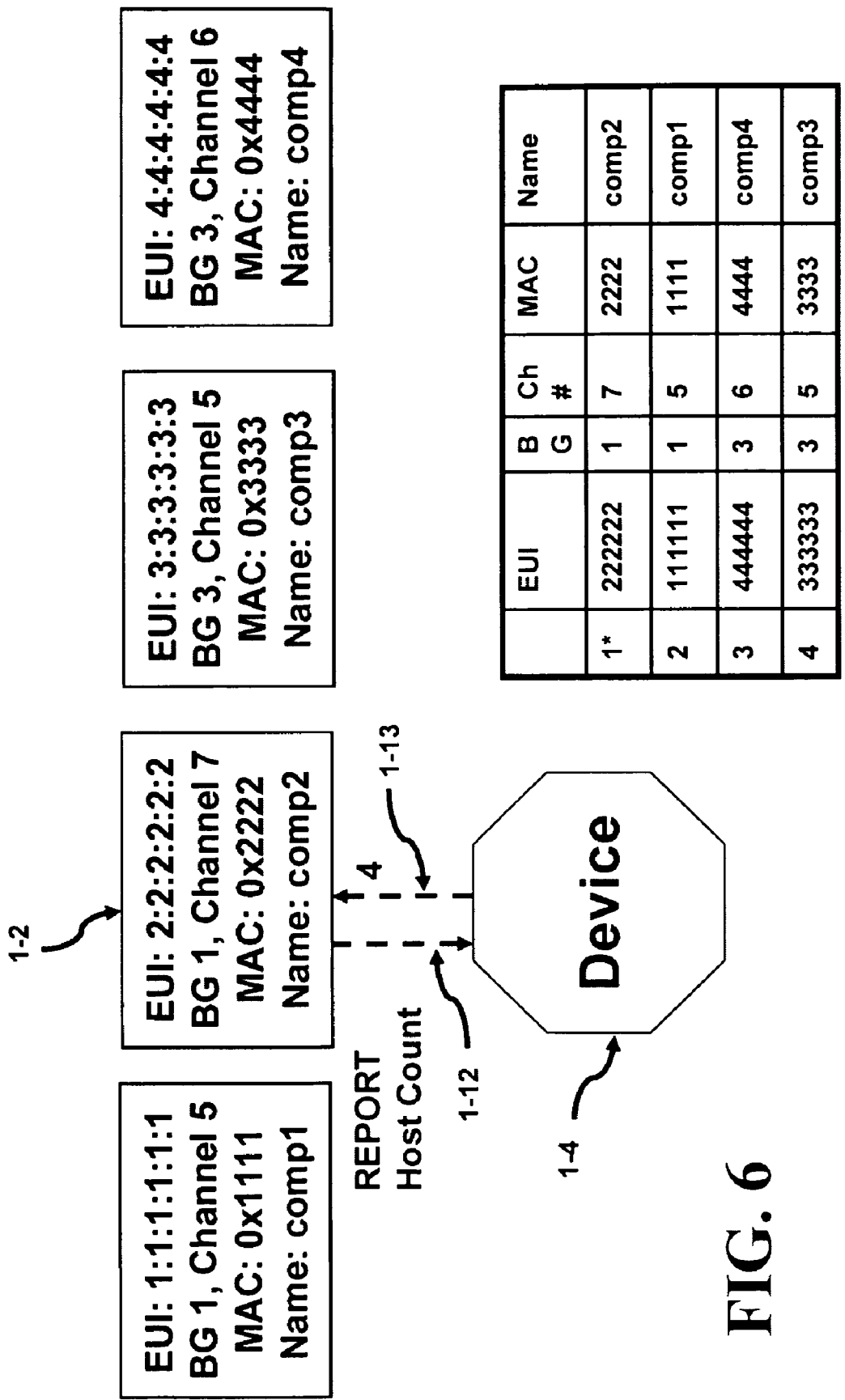
FIG. 6 depicts a report step and delivery of the number of hosts between a device and one of the hosts in accordance with the present invention.

In FIG. 6, the host 1-2 then asks the device 1-4 to send back a report 1-12 for host count 1-13. In this case, there are four hosts.

Figure 7:
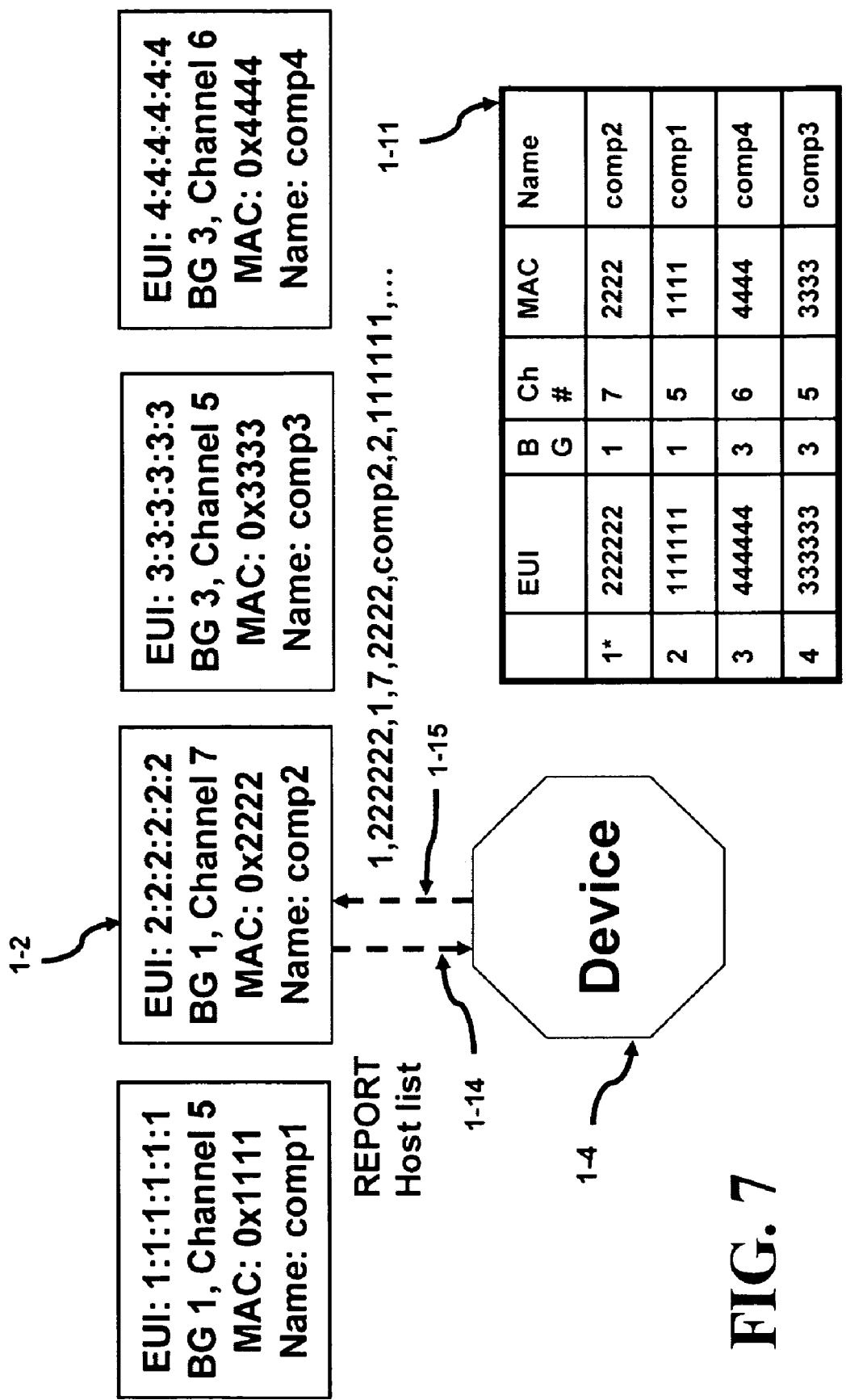
FIG. 7 shows a report step and delivery of the detailed information of all hosts between a device and one of the hosts in accordance with the present invention.

The host 1-2 then asks the device 1-4 to send back a report 1-14 of all the host information 1-15. FIG. 7 shows that the information 1-15 consists of at least one or more parameters from the table 1-11.

Figure 8:
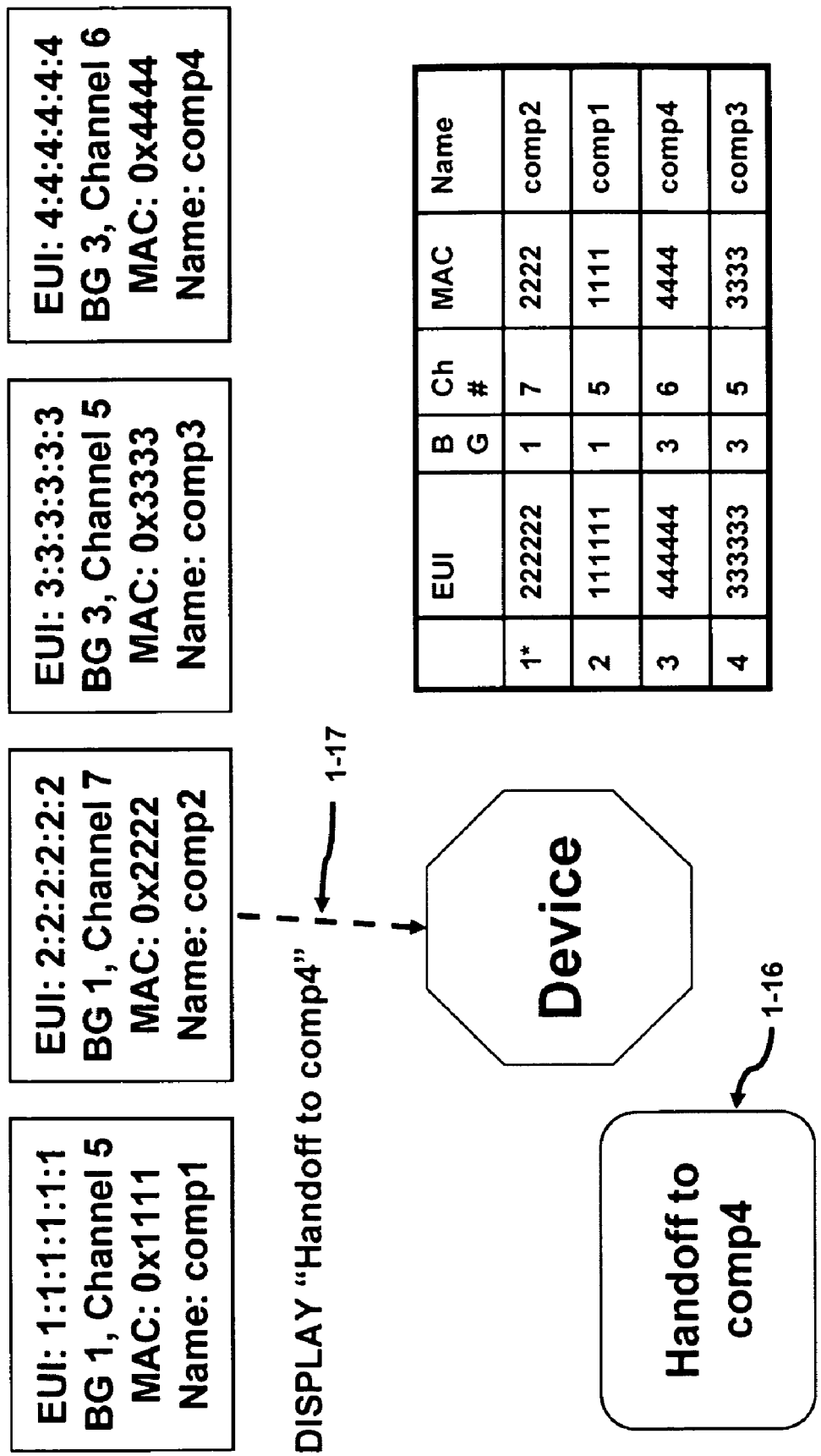
FIG. 8 illustrates a display step and a message posted on the device in accordance with the present invention.

Host now asks the device (who has display capability) to display 1-17 a message "Handoff to comp4" 1-16 as depicted in FIG. 8. This information can be read and then be can be used to make decisions.

Figure 9:
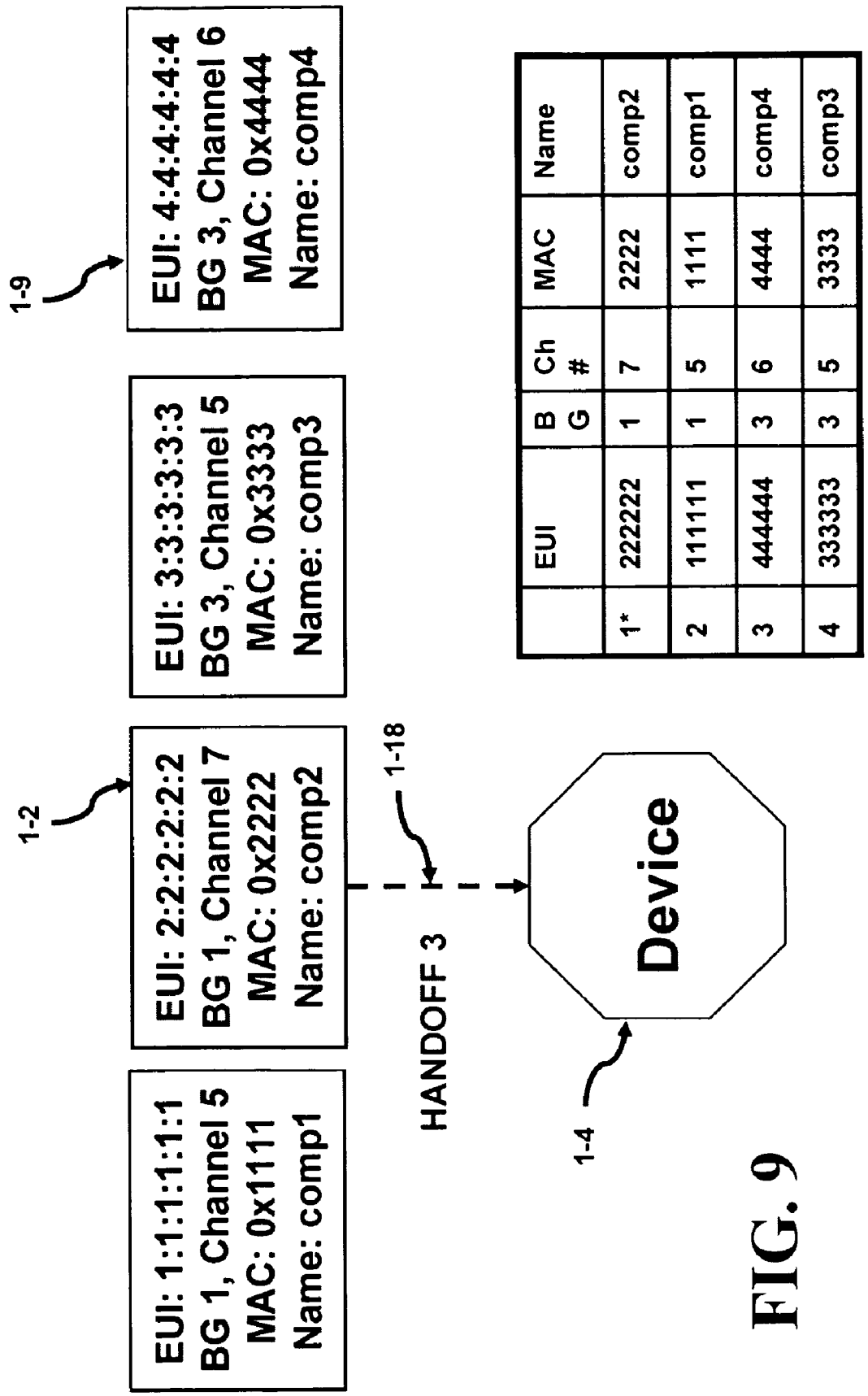
FIG. 9 shows a handoff step between a device and one of the hosts in accordance with the present invention.
Figure 10:
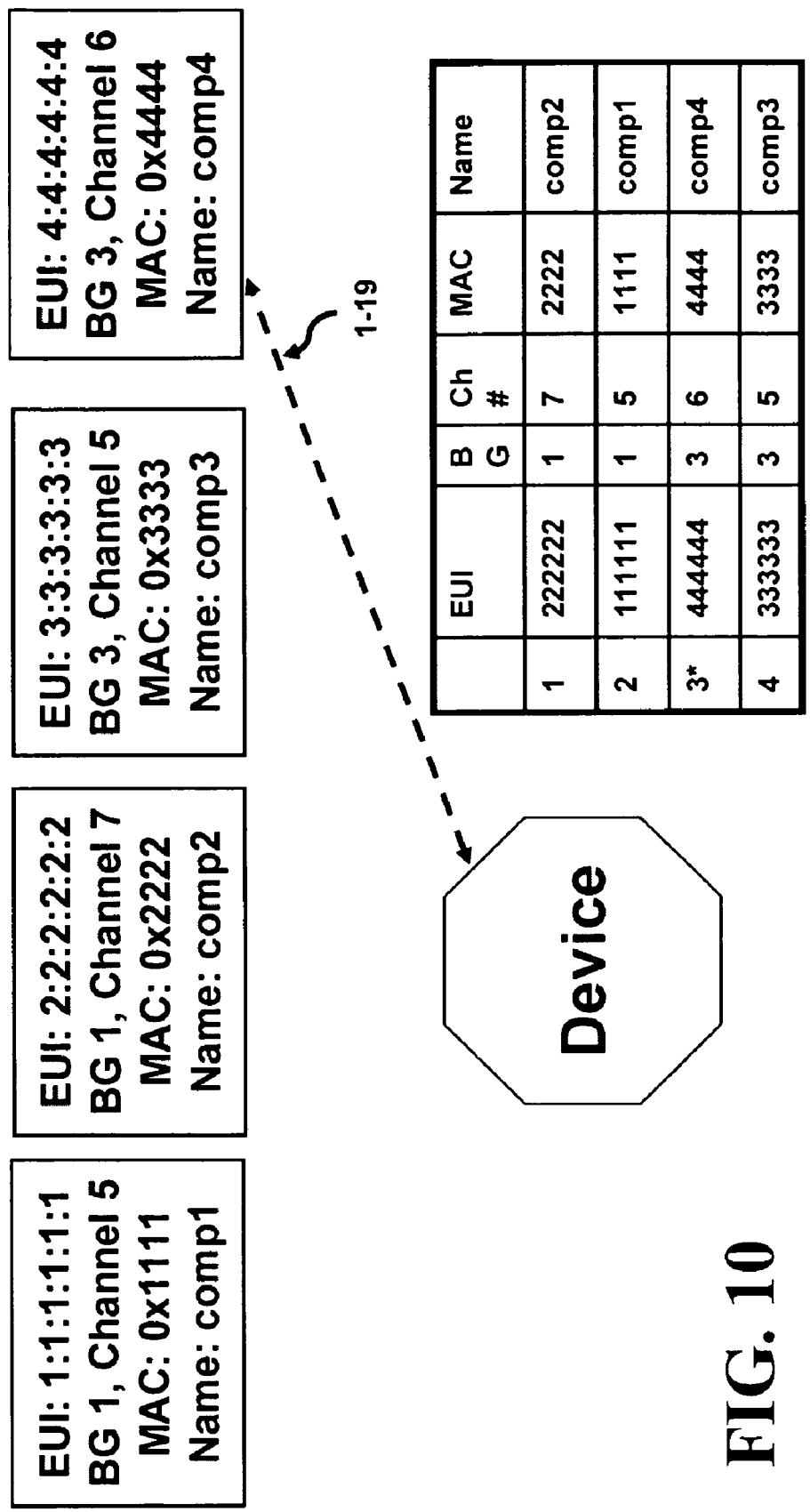
FIG. 10 illustrates the handoff being completed between a device and one of the hosts in accordance with the present invention.

FIG. 9 and FIG. 10 illustrate the Handoff 1-18 process performed by host 1-2. The host first begins by starting to send a request 1-18 to device 1-4 to ask device to disconnect the connection and try to connect to the host 1-9 with index 3, which is 'comp4'.

A time delay between the disconnection of the old host and the connection to a new host occurs in sequence. In other words, the connection to the old host is broken then the connection to the new host is made. Thus, the time delay is typically positive.

Continuing in FIG. 10, the device disconnects its connection to 'comp2' and starts the connection procedure 1-19 to connect the device 1-4 to 'comp4.' Note the asterisk in the first column on 3 which corresponds to "Comp4."

If the device has never associated with 'comp4', it will try to use one of the known association methods to associate with the 'comp4' before it can do any meaningful communication with 'comp4.'

Figure 11:
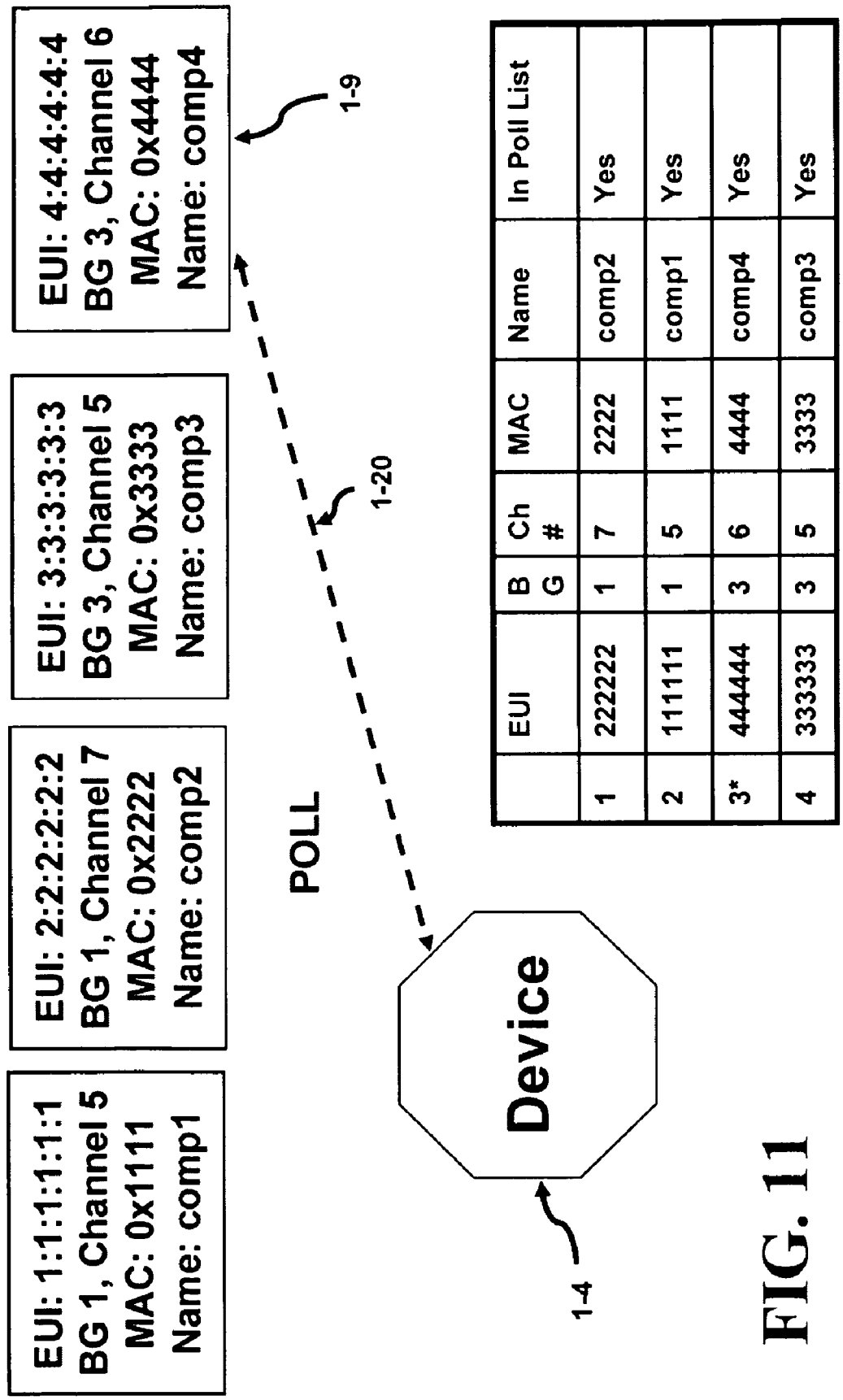
FIG. 11 shows a poll step between a device and one of the hosts in accordance with the present invention.
Figure 12:
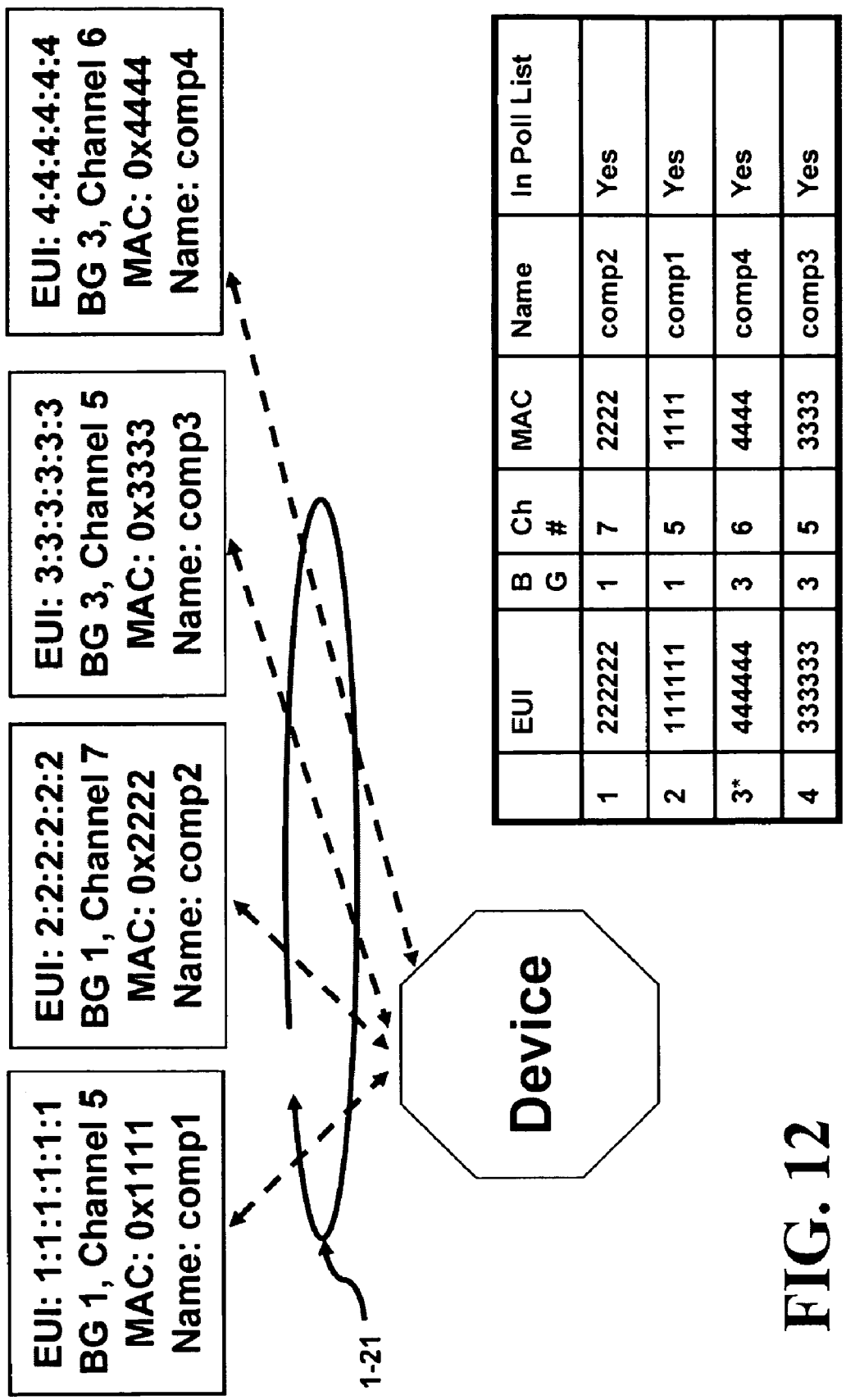
FIG. 12 depicts the polling process between a device and all of the hosts in accordance with the present invention.

FIG. 11 and FIG. 12 depict when the host 1-9 with name 'comp4' issues a 'POLL' command 1-20, the device 1-4 enters the polling mode 1-21 and it periodically connects to all the known hosts to see if there is any special task that needs to be accomplished. The asterisk is on entry 3 since this is the host who issue the poll command.

Figure 13:
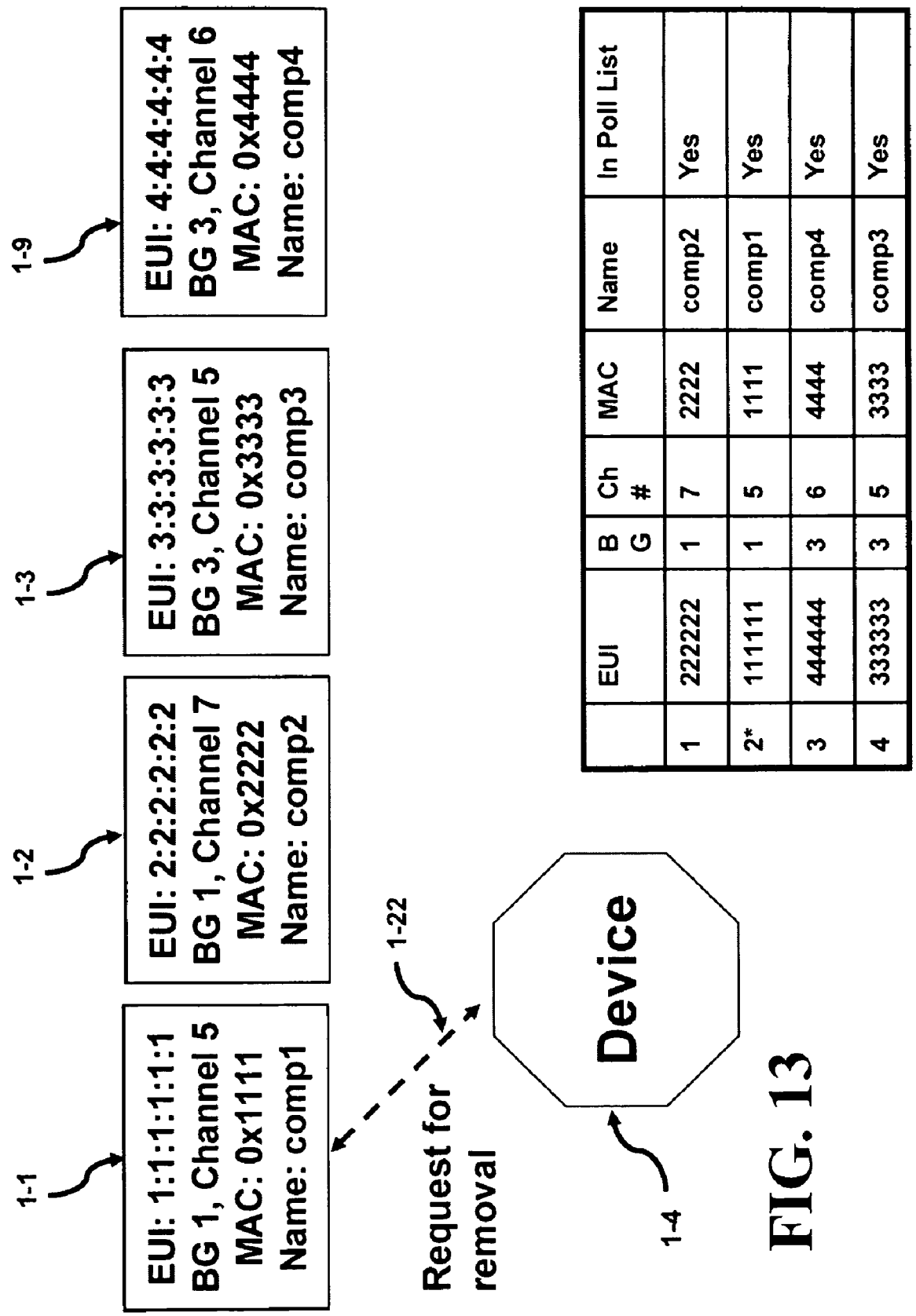
FIG. 13 illustrates the request for removal between a device and one of the hosts in accordance with the present invention.
Figure 14:
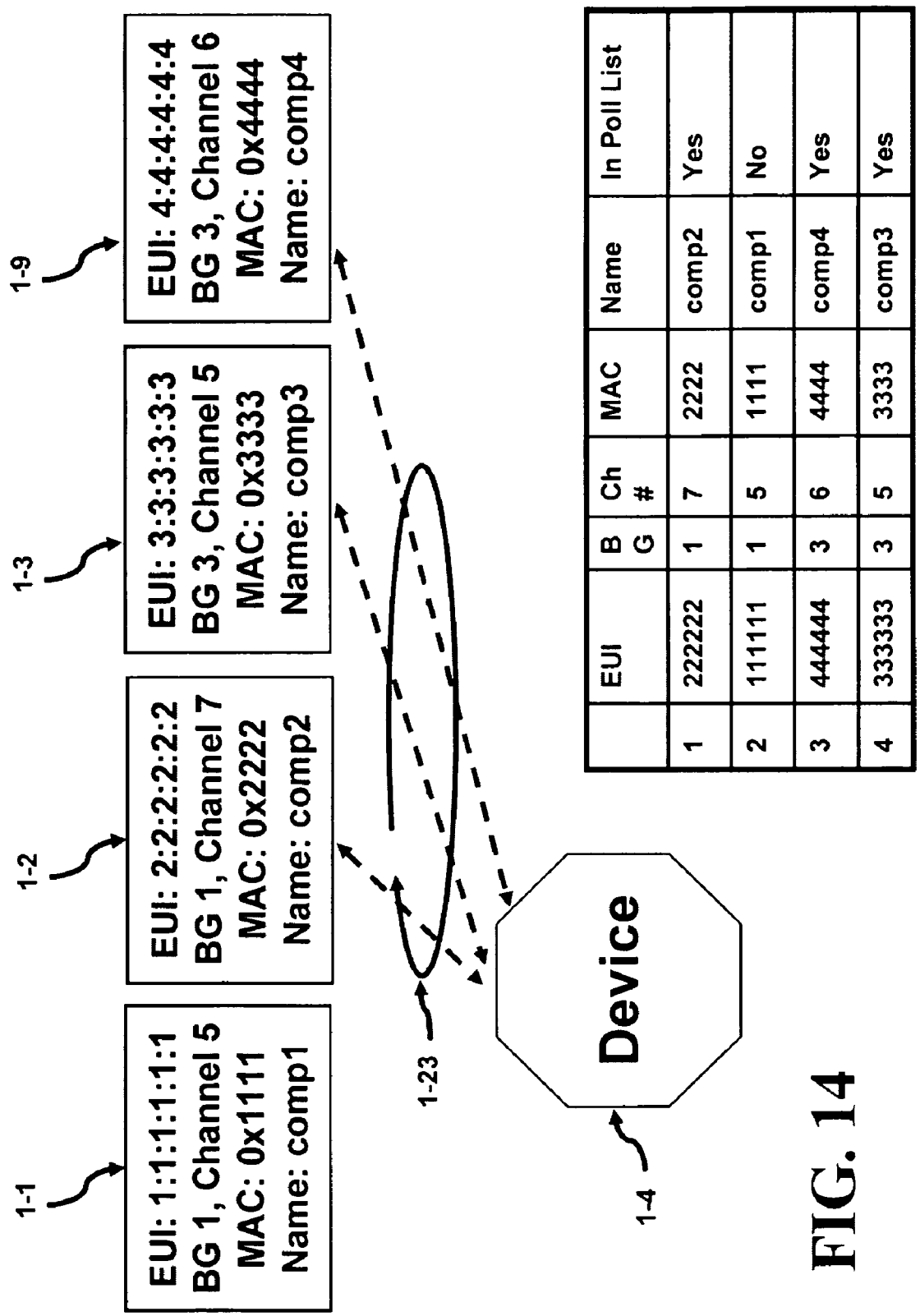
FIG. 14 illustrates the partial polling process between a device and the hosts in accordance with the present invention.

FIG. 13 shows a request for removal 1-22 from host 1-1 Comp1. There is no asterisk since the device is looping through all the hosts on the Poll List Continuing in FIG. 14, a 'POLL' command is illustrated, the device 1-4 enters the polling mode 1-23 and it periodically connects to all the known hosts to see if there is any special task that needs to be accomplished. Host 1-1 is not included since that host 1-1 has been removed. Another perspective is that the masters can be interrogated or polled; the slave can interrogate the masters for information. There is no asterisk since the device is looping through all the hosts on the Poll List.

Figure 15:
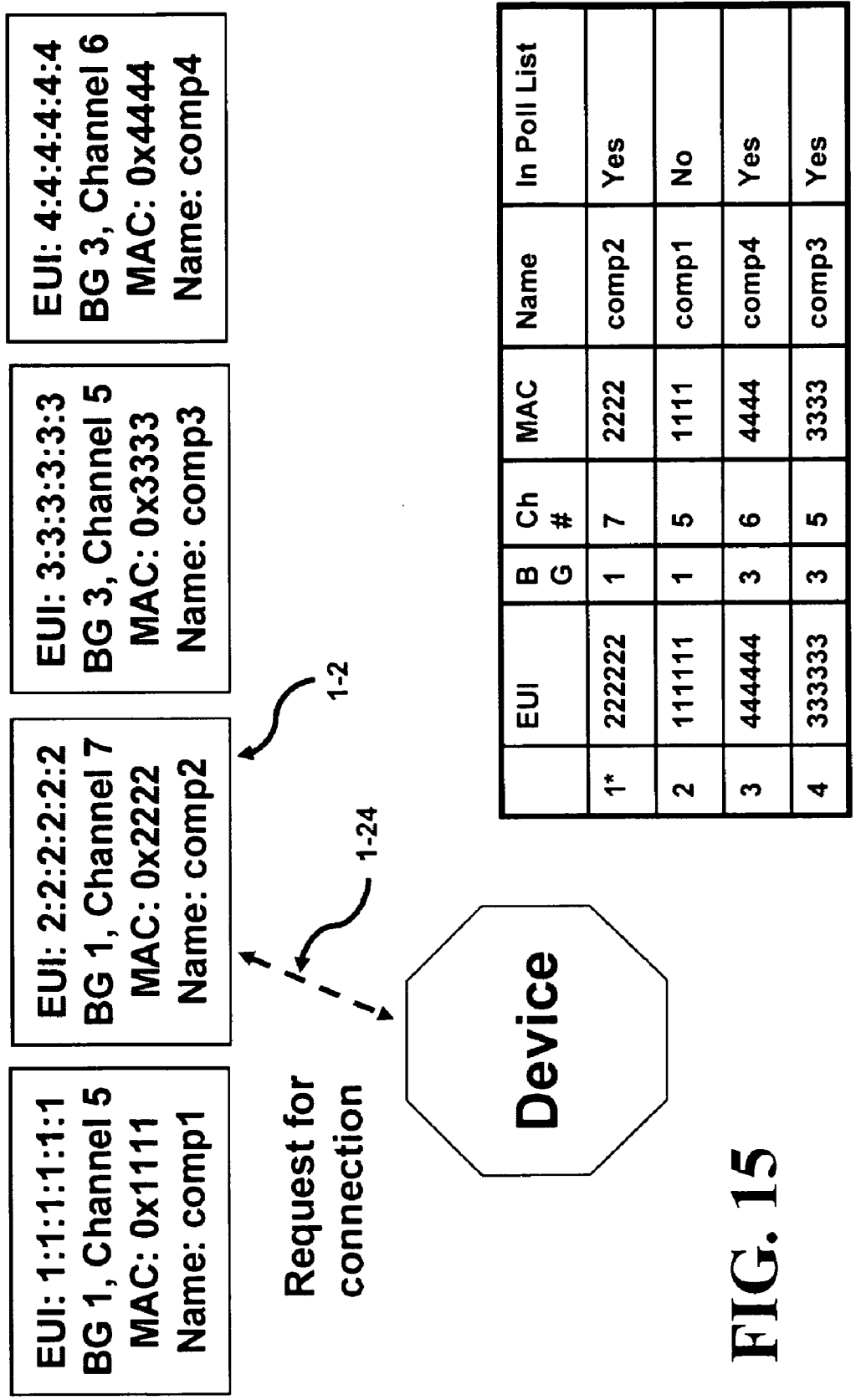
FIG. 15 illustrates the request for connection between a device and one of the hosts in accordance with the present invention.

FIG. 15 shows a request for connection 1-24 from host 1-2 Comp2.

Figure 16:
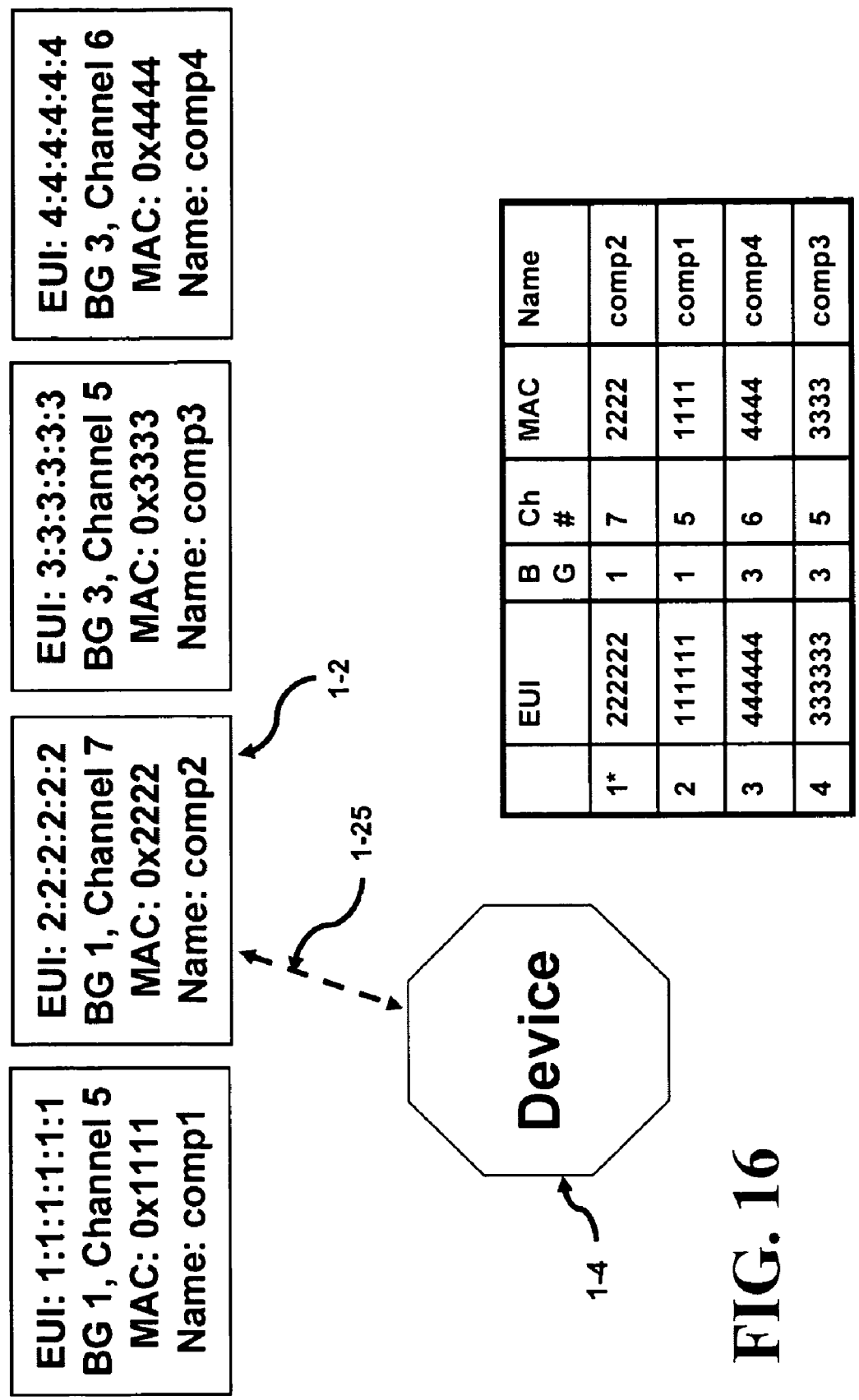
FIG. 16 illustrates the connection formed between a device and one of the hosts in accordance with the present invention.

FIG. 16 shows that host 1-2 Comp2 has been connected 1-25 to the device 1-4. Note the asterisk in the first column on 2 which corresponds to "Comp1."

Figure 17:
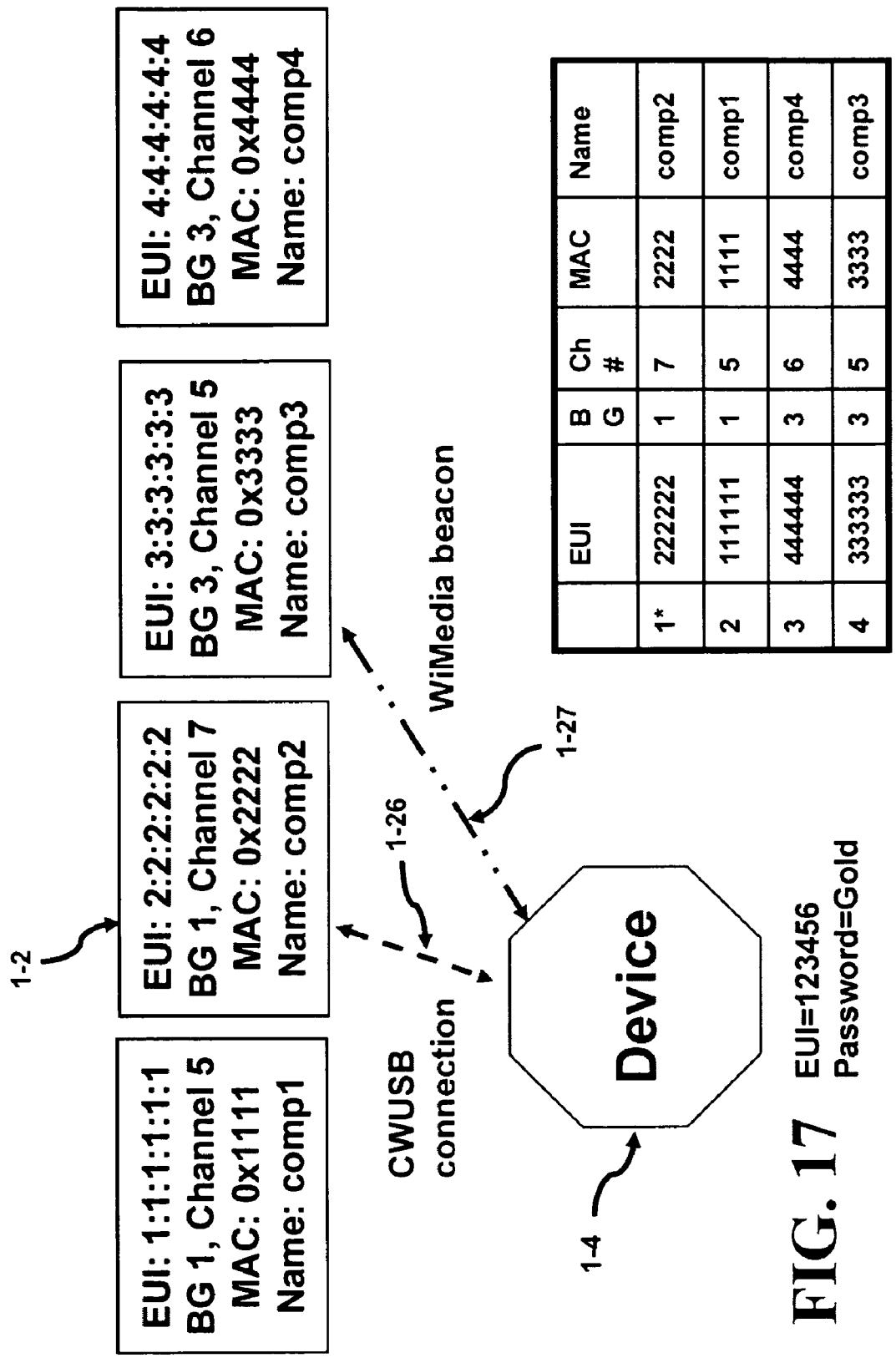
FIG. 17 illustrates the password secure method between a device and one of the hosts where a request for using the Out-of-band Host Request Protocol is given in accordance with the present invention.

FIG. 17 shows the device 1-4 with EUI=123456 and password setting="Gold" connected 1-26 to "comp2". The second host "comp3" wants 1-27 to use this device.

Figure 18:
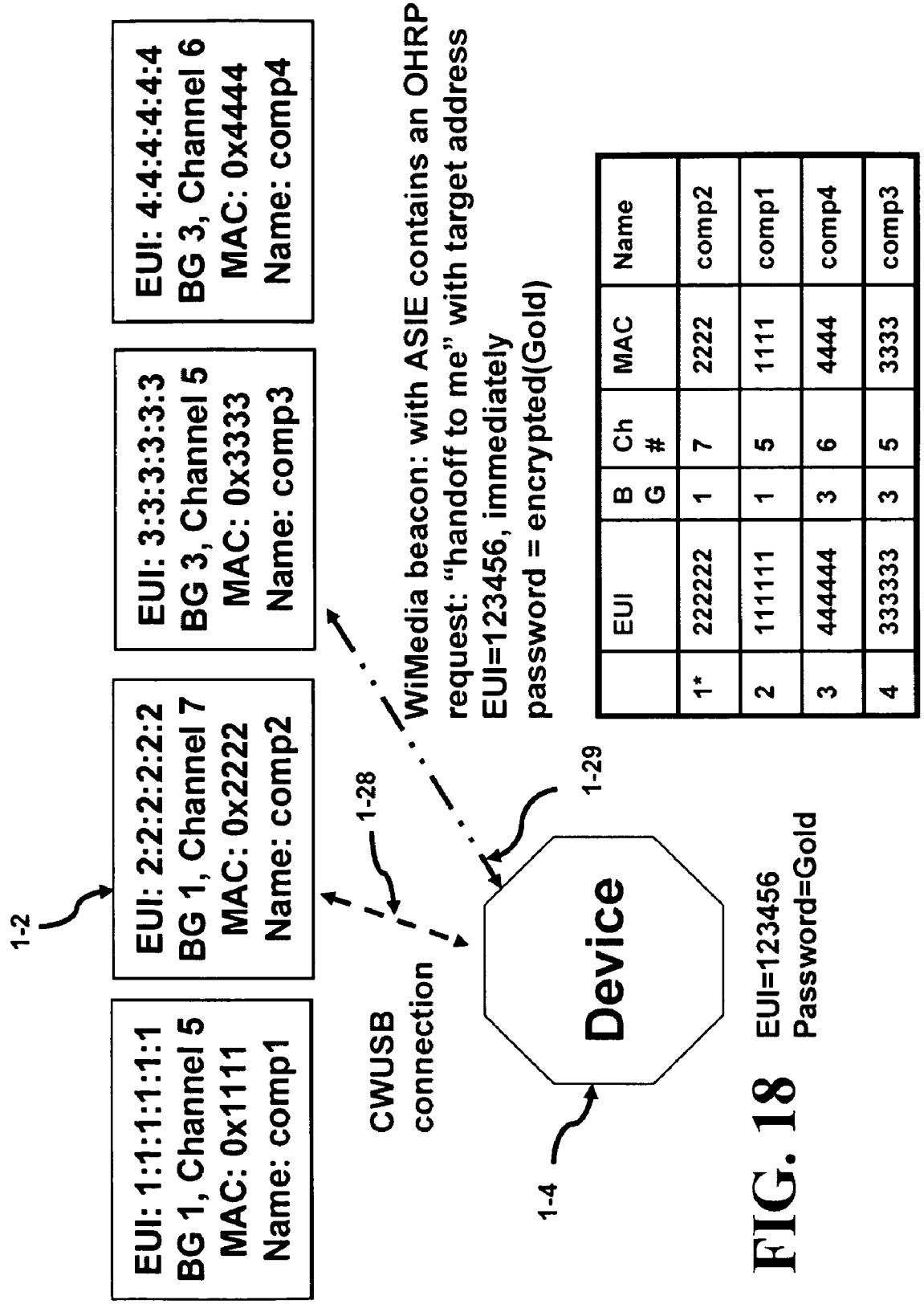
FIG. 18 illustrates the password secure method between a device and one of the hosts completing the Out-of-band Host Request Protocol in accordance with the present invention.

FIG. 18 shows "comp3" using the WiMedia beacon to execute OHRP by sending a request 1-29 through the beacon's ASIE and asking 1-4 the device with EUI=123456 to "handoff to me immediately" with the supplied encrypted password "Gold."

Figure 19:
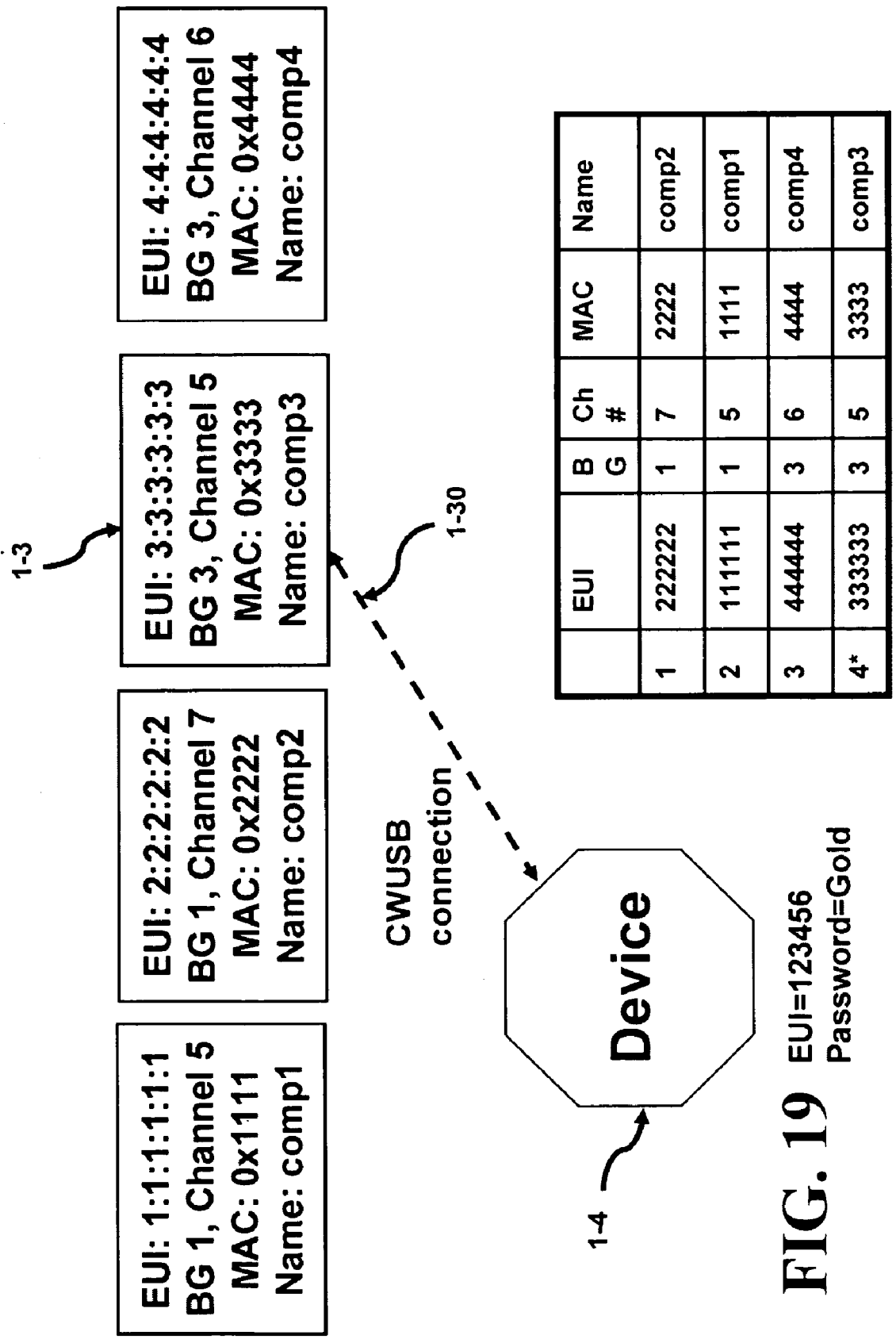
FIG. 19 illustrates the password secure method between a device and one of the hosts after the Out-of-band Host Request Protocol in accordance with the present invention.

FIG. 19 shows the device 1-4 receiving the OHRP request and deciding if it is ok to connect to "comp3." It then disconnects gracefully from "comp2" if possible and connects 1-30 to "comp3."

A special HMC driver and application is required for this system to work. When a host does not have driver for the HMC device, the appropriate software (include driver and application) for that particular computer platform (Windows, Mac OS, Linux, etc.) needs to installed. It will be better to have an auto-installation process included so that the host computer can access this Host Management System easily.

Finally, it is understood that the above description are only illustrative of the principle of the current invention. It is understood that the various embodiments of the invention, although different, are not mutually exclusive. In accordance with these principles, those skilled in the art may devise numerous modifications without departing from the spirit and scope of the invention. For example, the techniques of switching the slave between masters can be applicable for other wireless protocols. Some of the devices can have more than one function or several sub-functions. For example, a printer can have the sub-functions: print, scan, fax, and etc. The master can be a personal computer, PDA, cell phone, music player or audio system. The slave can be a projector, printer, flat screen, hard disc or speaker system. Manual interactions can be included in some of these operations if desired. The invention can be practiced in the entertainment, business, and gaming industries.

What is claimed is:

1. An apparatus comprising:
   a slave with a master table;
   a plurality of masters each emitting a corresponding wireless beacon;
   a first wireless connection formed between the slave and a first master selected from the plurality of masters;
   an informational content from each beacon is stored in the master table; and
   at least a portion of the informational content is sent to the first master;
   whereby the first master can determine from the informational content that the slave should establish a second wireless connection with one of the remaining masters after terminating the first wireless connection and thereby request the slave to establish the second wireless connection with said one of the remaining masters.

2. The apparatus of claim 1, further comprising:
   a positive time delay; whereby
   the time delay is measured after terminating the first wireless connection and establishing the second wireless connection.

3. The apparatus of claim 1, further comprising:
   a data link formed within the wireless connection; whereby
   the data link transfers data using a CWUSB protocol.

4. The apparatus of claim 3, whereby the data in the first wireless connection is independent of the data in the second wireless connection.

5. The apparatus of claim 1, whereby the wireless connection uses UWB modulation.

6. The apparatus of claim 1, whereby the wireless beacon uses a WiMedia beaconing mechanism.

7. The apparatus of claim 1, wherein the slave is a projector, printer, flat screen, hard disc, scanner, video camera or speaker system.

8. The apparatus of claim 1, wherein the master is a personal computer, PDA, cell phone, or intelligent TV.

9. A method of handing off a slave wirelessly connected to a first master to a second master selected from a plurality of masters comprising the steps of:
   initializing a data base held in the slave;
   scanning for wireless packets emitted by each of the masters for informational content;
   storing the informational content from the masters in the data base;
   reporting the informational content held in the slave to the first master;
   requesting, by the first master, the slave to halt wireless connections with the first master; and
   establishing, by the slave, a wireless connection to the second master;
   thereby handing off the slave connected to the first master to the second master selected from the plurality of masters.

10. The method of claim 9, further comprising the steps of:
    delaying the establishment of the wireless connection with the second master after terminating the wireless connections with the first master a positive amount.

11. The method of claim 9, further comprising the steps of:
    forming a data link within the wireless connection; whereby
    the data link transfers data using a CWUSB protocol.

12. The method of claim 11, whereby the data transferred within the wireless connection to the first master is independent of the data transferred within the wireless connection to the second master.

13. The method of claim 9, whereby the wireless connection uses UWB modulation.

14. The method of claim 9, whereby the wireless packets comprises data.

15. The method of claim 14, whereby the data comprises a second communication channel using a WiMedia beaconing mechanism.

16. The method of claim 9, wherein the slave is a projector, printer, flat screen, hard disc, scanner, video camera or speaker system.

17. The method of claim 9, wherein the master is a personal computer, PDA, cell phone, or intelligent TV.

18. A method of polling a plurality of masters comprising the steps of:
    a) connecting to one of the plurality of masters;
    b) interrogating the current master;
    c) storing interrogation results in memory;
    d) sharing the interrogation results about the other masters with the current master;
    e) performing whatever actions the current master requested;
    f) requesting release from the current master;
    g) selecting a different master from the plurality of masters; and repeating steps a) through g) unless a request to exit polling has been received; thereby polling the plurality of masters.

19. The method of claim 18, further comprising the steps of:
    delaying by a positive amount the selection of the different master with the release from the current master.

20. The method of claim 18, further comprising the steps of:
    forming a data link during the polling process;
    whereby the data link transfers data using a CWUSB protocol.

21. The method of claim 18, whereby the connection to one of the plurality of masters is a wireless connection.

22. The method of claim 18, whereby the wireless connection uses UWB modulation.

23. The method of claim 18, wherein the slave is a projector, printer, flat screen, hard disc, scanner, video camera or speaker system.

24. The method of claim 18, wherein the master is a personal computer, PDA, cell phone, intelligent TV.

25. An apparatus comprising:
    a device coupled to a first host selected from a plurality of hosts using a first protocol;

a WiMedia protocol that allows the device to receive a beacon from each of the plurality of hosts;

an informational content embedded into at least one beacon emitted by a second host selected from the plurality of hosts, wherein the informational content is transmitted from each of the plurality of hosts using the WiMedia protocol which is different than the first protocol; whereby the informational content instructs the device to interact with the second host using the first protocol.

26. The apparatus of claim 25, whereby the first protocol is a CWUSB protocol.

27. The apparatus of claim 25, whereby the beacon carries a payload.

28. The apparatus of claim 25, whereby the informational content instructs the device to disconnect from the first host.

29. The apparatus of claim 25, whereby the informational content instructs the device to connect to the second host.

30. The apparatus of claim 25, whereby the informational content instructs the device to poll the plurality of hosts.

31. The apparatus of claim 25, whereby the informational content instructs the device to perform a Request type.

32. The apparatus of claim 25, whereby the informational content is based on an Application-Specific Information Element (ASIE) that can be used to do any specific application task.

* * * * *